Patented Sept. 26, 1950

2,523,384

UNITED STATES PATENT OFFICE 2,523,384

RIPENING PROCESS

Mervin E. Martin and William E. Kight, Cumberland, Md., assignors to Celanese Corporation of America, a corporation of Delaware No Drawing. Application July 17, 1946,
Serial No. 684,245

8 Claims. (Cl. 260—230)

This invention relates to the production of organic acid esters of cellulose, such as cellulose acetate, and relates more particularly to an improved process for the ripening or hydrolysis of primary organic acid esters of cellulose to secondary cellulose esters having the desired acyl value and solubility characteristics.

An object of this invention is the provision of an improved process for effecting the ripening or hydrolysis of organic acid esters of cellulose whereby the ripening may be conducted at a relatively high temperature while maintaining the progress and speed of the ripening reaction under close control.

Other objects of this invention will appear from the following detailed description.

In the process of preparing organic acid esters of cellulose, such as cellulose acetate, for example, the esterification reaction is usually carried out by treating cellulose with an organic acid anhydride in the presence of a catalyst such as sulfuric acid or phosphoric acid, and an organic acid diluent, or solvent, for the cellulose ester being formed. The fully esterified cellulose triester produced is obtained in the form of a viscous, homogeneous solution in the organic acid diluent employed. Water is then added to this primary cellulose ester solution in an amount sufficient to convert any organic acid anhydride remaining to the corresponding acid. The primary cellulose ester, usually after the addition of a further quantity of water for ripening, is permitted to hydrolyze or ripen in solution with the catalyst present, from the cellulose tri-ester initially formed to a secondary cellulose ester, i. e. one of a lower degree of esterification having the desired solubility characteristics. During ripening not only are acyl groups hydrolyzed but, in addition, combined sulfuric acid is removed from the cellulose ester. Water and/or other non-solvent for the cellulose ester is then added in amounts sufficient to precipitate the ripened or secondary cellulose ester from solution. The precipitated cellulose ester is washed with water to remove as much acid and other non-cellulose ester materials as possible. The cellulose ester is then subjected to a stabilizing treatment with the object of still further reducing its content of combined sulfuric acid so as to avoid any decomposition, degradation and/or discoloration when the cellulose ester is exposed to elevated temperatures, as during molding operations. The stability of the cellulose ester is measured by the degree of acidity developed when a sample of the cellulose ester is heated in distilled water under pressure for a predetermined period of time. The development of an excessive degree of acidity indicates a product of unsatisfactory stability.

Thus, for example, in the preparation of cellulose acetate in accordance with the above esterification process, the acetylation reaction may take 1½ to 7 hours, and the ripening 20 to 45 or 50 hours, with the stabilization of the precipitated and washed cellulose acetate taking from 3 to 6 hours to achieve the desired degree of stability. The time necessary to produce a ripened or hydrolyzed cellulose acetate of the desired acetyl value may be shortened by effecting the ripening at temperatures above room temperature. However, when ripening is conducted at temperatures substantially above room temperature, say at temperatures of 60 to 100° C., the sulfuric acid present causes the acetyl hydrolysis to take place quite rapidly, and renders accurate and close control of the hydrolysis reaction quite difficult particularly where the sulfuric acid which splits off during ripening increases the sulfuric acid present by an undetermined amount.

We have now found that cellulose acetate, as well as other organic acid esters of cellulose, may be ripened to the desired acyl value at elevated temperatures in a relatively short period of time while retaining close and accurate control over the hydrolysis reaction. In accordance with our novel process, this advantageous result may be obtained if the acid catalyst present in the reaction mixture obtained on completion of esterification is completely neutralized by the addition thereto of an excess of a suitable neutralizing agent, then adding to the neutralized cellulose ester solution from 3 to 10% of ammonium bisulfate, based on the weight of the original cellulose together with water for ripening in an amount on the order of 33 to 45% based on the weight of the original cellulose, and finally ripening the primary cellulose ester in solution to the desired solubility characteristics at a temperature of from about 60 to about 100° C. or higher. The presence of an excess of neutralizing agent in the ripening primary solution, say, about 10%, not only neutralizes all the free sulfuric acid present but also acts to neutralize any combined sulfuric acid which is split off during the course of the ripening. Thus, only the added ammonium bisulfate acts to aid the ripening reaction since the sulfuric acid is neutralized directly as it is split off.

Our novel process, therefore, eliminates the problems of maintaining the sulfuric acid content at the desired value and of effectively controlling the increase in the sulfuric acid concentration encountered during the usual ripening process due to the splitting off of combined sulfuric acid. Not only does our novel process permit close and accurate control of the ripening reaction to be achieved so that ripened cellulose esters of any desired specific acyl value may be obtained but we have found that the cellulose esters so produced are of improved stability and do not require any subsequent stabilization treatment to be satisfactory for use in molding operations.

Any suitable neutralizing agent may be employed for the neutralization of the acid catalyst such as, for example, magnesium acetate, zinc acetate, aluminum acetate, calcium acetate, strontium acetate, barium acetate, strontium oxide, barium oxide, strontium hydroxide, barium hydroxide and magnesium carbonate. We prefer to avoid the use of neutralizing agents which form sodium salts, since the presence of sodium salts during ripening is undesirable as said sodium salts tend to inhibit the splitting off of sulfates, i. e. combined sulfuric acid, during ripening.

In order further to illustrate our invention but without being limited thereto the following example is given:

Example 100 parts by weight of cotton linters are pretreated with a mixture of 0.5 part by weight of sulfuric acid, 0.5 part by weight of water and 35 parts by weight of glacial acetic acid. The mixture is tumbled for a short time to insure a uniform distribution of the liquid and is then left to stand for 3 hours at a temperature of 35° C. to complete the activation of the cellulose. After activation, the cellulose is entered into an acetylizer containing a mixture of 245 parts by weight of acetic anhydride, 325 parts by weight of glacial acetic acid and 11.5 parts by weight of sulfuric acid cooled to a temperature of −6.5° C. The acetylation reaction is allowed to continue for about 2 hours with a peak temperature of 43° C. being reached. After completion of esterification, sufficient aqueous magnesium acetate solution is added to the acetylation mixture to neutralize all of the sulfuric acid, and provide a 10% excess, the water added with the magnesium acetate amounting to 45% on the weight of the cellulose being acetylated.

The neutralized primary solution of cellulose acetate is then heated to 60° C. in a steam jacketed vessel and then steam is injected directly into the charge until the temperature reaches 100° C. At this point, 3.4% of ammonium bisulfate on the weight of the cellulose is added and the primary cellulose acetate in solution allowed to ripen to the desired acetyl value, the temperature gradually dropped to about 90° C. during the course of the ripening. After ripening for about 12 hours, with the temperature remaining above 90° C., the cellulose acetate reaches an acetyl value of about 54%, calculated as acetic acid and is then precipitated from solution by the addition of an excess of water thereto. After being washed neutral and dried, the cellulose acetate obtained is found to be of excellent stability, requiring no stabilization treatment prior to being employed in molding operations. The ripening of the primary cellulose actate proceeds in a smooth, uniform fashion and since it is under close control at all times, the primary cellulose acetate may be ripened as desired to secondary cellulose acetates of the acetyl values desired without the necessity for frequent testing to determine the extent of the ripening.

While our invention has been more particularly described in connection with the production of highly stable, ripened cellulose acetate, it will be understood, of course, that our novel ripening process may also be employed in the production of other highly stable ripened or hydrolyzed organic acid esters of cellulose. Examples of other organic acid esters of cellulose which may be prepared by our novel process are cellulose propionate and cellulose butyrate, as well as mixed esters, such as cellulose acetate-propionate, and cellulose acetate-butyrate.

In the appended claims, all references to percentages by weight are based upon the weight of the original cellulose undergoing esterification.

It is to be understood that the foregoing detailed description is given merely by way of illustration and that many variations may be made therein without departing from the spirit of our invention.

Having described our invention, what we desire to secure by Letters Patent is:

1. In a process for the production of organic acid esters of cellulose of improved characteristics wherein cellulose is esterified with a lower aliphatic acid anhydride employing a lower aliphatic acid as solvent and an inorganic acid selected from the group consisting of sulfuric acid and phosphoric acid as catalyst, the steps which comprise adding to the primary cellulose ester solution, obtained on completion of esterification, water for ripening and a neutralizing agent in an amount at least sufficient to neutralize completely all the inorganic acid employed as catalyst, adding ammonium bisulfate to the primary cellulose ester solution, and ripening the primary cellulose ester to a secondary cellulose ester at an elevated temperature, said ammonium bisulfate acting to aid the ripening reaction.

2. In a process for the production of organic acid esters of cellulose of improved characteristics wherein cellulose is esterified with a lower aliphatic acid anhydride employing a lower aliphatic acid as solvent and an inorganic acid selected from the group consisting of sulfuric acid and phosphoric acid as catalyst, the steps which comprise adding to the primary cellulose ester solution, obtained on completion of esterification, water for ripening and a neutralizing agent in an amount at least about 10% in excess of that required to neutralize completely all the inorganic acid employed as catalyst, adding ammonium bisulfate to the primary cellulose ester solution, and ripening the primary cellulose ester to a secondary cellulose ester at an elevated temperature, said ammonium bisulfate acting to aid the ripening reaction.

3. In a process for the production of cellulose acetate of improved characteristics wherein cellulose is esterified with acetic anhydride, employing acetic acid as solvent and sulfuric acid as catalyst, the steps which comprise adding to the primary cellulose acetate solution, obtained upon completion of esterification, water for ripening and a neutralizing agent in an amount at least sufficient to neutralize completely all the sulfuric acid employed as catalyst, adding ammonium bisulfate to the primary cellulose acetate solution, and ripening the primary cellulose acetate to a secondary cellulose acetate at an elevated temperature, said ammonium bisulfate acting to aid the ripening reaction.

4. In a process for the production of cellulose acetate of improved characteristics wherein cellulose is esterified with acetic anhydride, employing acetic acid as solvent and sulfuric acid as catalyst, the steps which comprise adding to the primary cellulose acetate solution, obtained upon completion of esterification, water for ripening and a neutralizing agent in an amount at least sufficient to neutralize completely all the sulfuric acid employed as catalyst, adding from 3 to 10% by weight of ammonium bisulfate to the primary cellulose acetate solution, and ripening the primary cellulose acetate to a secondary cellulose acetate at an elevated temperature, said ammonium bisulfate acting to aid the ripening reaction.

5. In a process for the production of cellulose acetate of improved characteristics wherein cellulose is esterified with acetic anhydride, employing acetic acid as solvent and sulfuric acid as catalyst, the steps which comprise adding to the primary cellulose acetate solution, obtained upon completion of esterification, water for ripening and a neutralizing agent in an amount at least sufficient to neutralize completely all the sulfuric acid employed as catalyst, adding 3 to 10% by weight of ammonium bisulfate to the primary cellulose acetate solution, and ripening the primary cellulose acetate to a secondary cellulose acetate at a temperature of 60 to 100° C., said ammonium bisulfate acting to aid the ripening reaction.

6. In a process for the production of cellulose acetate of improved characteristics wherein cellulose is esterified with acetic anhydride, employing acetic acid as solvent and sulfuric acid as catalyst, the steps which comprise adding to the primary cellulose acetate solution, obtained upon completion of esterification, 33 to 45% by weight of water for ripening and a neutralizing agent in an amount at least sufficient to neutralize completely all the sulfuric acid employed as catalyst, adding from 3 to 10% by weight of ammonium bisulfate to the primary cellulose acetate solution, and ripening the primary cellulose acetate to a secondary cellulose acetate at a temperature of 60 to 100° C., said ammonium bisulfate acting to aid the ripening reaction.

7. In a process for the production of cellulose acetate of improved characteristics wherein cellulose is esterified with acetic anhydride, employing acetic acid as solvent and sulfuric acid as catalyst, the steps which comprise adding to the primary cellulose acetate solution, obtained upon completion of esterification, water for ripening and a neutralizing agent in an amount at least sufficient to neutralize completely all the sulfuric acid employed as catalyst, adding from 3 to 10% by weight of ammonium bisulfate to the primary cellulose acetate solution, and ripening the primary cellulose acetate to a secondary cellulose acetate by heating the cellulose acetate solution to a temperature of 60 to 100° C. by the direct injection of steam therein, said ammonium bisulfate acting to aid the ripening action.

8. In a process for the production of cellulose acetate of improved characteristics wherein cellulose is esterified with acetic anhydride, employing acetic acid as solvent and sulfuric acid as catalyst, the steps which comprise adding to the primary cellulose acetate solution, obtained upon completion of esterification, water for ripening and magnesium acetate in an amount at least sufficient to neutralize completely all the sulfuric acid employed as catalyst, adding from 3 to 10% by weight of ammonium bisulfate to the primary cellulose acetate solution, and ripening the primary cellulose acetate to a secondary cellulose acetate by heating the cellulose acetate solution to a temperature of 60 to 100° C. by the direct injection of steam therein, said ammonium bisulfate acting to aid the ripening reaction.

MERVIN E. MARTIN.
WILLIAM E. KIGHT.

REFERENCES CITED

The following references are of record in the file of this patent:

UNITED STATES PATENTS

| Number | Name | Date |
|---|---|---|
| 1,723,614 | Gruber | Aug. 6, 1929 |
| 2,095,326 | Haney | Oct. 12, 1937 |
| 2,099,753 | Roberts et al. | Nov. 23, 1937 |
| 2,165,850 | Gruber et al. | July 11, 1939 |
| 2,244,295 | Heath | June 3, 1941 |
| 2,285,536 | Seymour | June 9, 1942 |

OTHER REFERENCES

Glasstone Textbook of Physical Chemistry, Sec. Edition 1946, page 1128, 1 page.